(12) United States Patent
Gong et al.

(10) Patent No.: US 11,851,381 B2
(45) Date of Patent: Dec. 26, 2023

(54) APPLICATION OF FARNESENE IN PREPARING PLANT-DERIVED UREASE INHIBITOR

(71) Applicant: INSTITUTE OF APPLIED ECOLOGY, CHINESE ACADEMY OF SCIENCES, Shenyang (CN)

(72) Inventors: Ping Gong, Shenyang (CN); Zhijie Wu, Shenyang (CN); Lili Zhang, Shenyang (CN); Dongpo Li, Shenyang (CN)

(73) Assignee: INSTITUTE OF APPLIED ECOLOGY, CHINESE ACADEMY OF SCIENCES, Shenyang (CN)

( * ) Notice: Subject to any disclaimer, the term of this patent is extended or adjusted under 35 U.S.C. 154(b) by 0 days.

(21) Appl. No.: 18/297,648

(22) Filed: Apr. 10, 2023

(65) Prior Publication Data
US 2023/0373876 A1 Nov. 23, 2023

(30) Foreign Application Priority Data
May 23, 2022 (CN) .......................... 202210560779.7

(51) Int. Cl.
*C05G 3/90* (2020.01)
(52) U.S. Cl.
CPC ..................................... *C05G 3/90* (2020.02)
(58) Field of Classification Search
None
See application file for complete search history.

(56) References Cited

U.S. PATENT DOCUMENTS

| 2003/0139711 | A1 | 7/2003 | Roe et al. |
| 2015/0218060 | A1 | 8/2015 | Hayes |
| 2018/0127327 | A1* | 5/2018 | Ovokaitys ............... A01G 7/04 |
| 2022/0130493 | A1 | 4/2022 | Turner et al. |

FOREIGN PATENT DOCUMENTS

| JP | 2002029978 A | 1/2002 |
| JP | 2004091338 A | 3/2004 |
| WO | WO 2021/202860 A1 * | 10/2021 ............. A01N 25/30 |

OTHER PUBLICATIONS

Huang Sai-Yuan et al., Journal of Zhongkai University of Agriculture and Engneering, Effects of flavonoids on growth of urease-secreting fungi, 2009, pp. 13-16, vol. 22, Issue 1, China.

* cited by examiner

*Primary Examiner* — Wayne A Langel
(74) *Attorney, Agent, or Firm* — True Shepherd LLC; Andrew C. Cheng

(57) ABSTRACT

An application of farnesene in preparing a plant-derived urease inhibitor is provided. The compound can effectively inhibit activities of *Canavalia ensiformis* urease and soil urease, and has an effect that is equivalent to that of commercial urease inhibitor acetohydroxamic acid. The urease inhibitor in the present disclosure, derived from plants, has "pollution-free" characteristics of natural products, high biological safety, simple and stable chemical structure and remarkable urease inhibition effect, can solve the problems of conventional chemically-synthesized urease inhibitor such as high toxicity, easy degradation and poor stability, also provides a new concept for creating a biological ecological technology for efficiently inhibiting the rapid hydrolysis of urea in farmland and increasing the utilization rate of urea nitrogen fertilizer, and has good application value and development prospect.

1 Claim, 4 Drawing Sheets

APPLICATION OF FARNESENE IN PREPARING PLANT-DERIVED UREASE INHIBITOR

CROSS-REFERENCE TO RELATED APPLICATIONS

This application claims priority to Chinese Patent Application No. 202210560779.7 with a filing date of May 23, 2022. The content of the aforementioned application, including any intervening amendments thereto, is incorporated herein by reference.

TECHNICAL FIELD

The present disclosure relates to the technical field of urease inhibitors, and more particularly relates to an application of farnesene in preparing a plant-derived urease inhibitor.

BACKGROUND OF INVENTION

Urea is a most common variety of nitrogen fertilizer, and has high nutrients and low cost, which is widely used in agricultural production. However, the direct application of urea has the disadvantages of fast nutrient transformation and low utilization rate of nitrogen; urea applied to the soil rapidly generates ammonium nitrogen under the hydrolysis of urease, and only 30%-60% of nitrogen is absorbed and used by crops; and the application of a large amount of urea leads to economic and resource waste, and also leads to the environmental problems such as acidification and hardening of soil, eutrophication of water and air pollution. Since 1960s, various countries all over the world have carried out a series of research work to delay urea hydrolysis and nutrient transformation, and developed various new urea. The stable urea with a urease inhibitor can effectively increase the utilization rate of the urea nitrogen fertilizer. The urease inhibitors act on urease and urease-generating organisms to slow down the hydrolysis of urea-amide nitrogen to ammonia nitrogen in the soil, so as to regulate the hydrolysis rate of urea, further reduce the subsequent volatilization loss of ammonium and concentration of nitrates generated by nitrification, and further reduce the leaching loss of nitrates and the losses of gaseous nitrogen such as $N_2$ and $N_2O$.

At present, the urease inhibitors that have been determined mainly include urease inhibitors of heavy metal ions, metal complexes, phosphoramides, hydroxamic acids, etc. However, most of the above urease inhibitors have the problems such as unstable effect, high toxicity and easy degradation, so these urease inhibitors are difficult to popularize and use in different areas, and long-term application may bring pollution to the environment. Compared with the artificial chemically-synthesized urease inhibitors, extracts from plants are natural compounds and have little impact on the ecological environment. Therefore, a new type of urease inhibitors with high efficiency and low toxicity is selected.

SUMMARY OF THE INVENTION

The objective of the present disclosure is to provide an application of farnesene in preparing a plant-derived urease inhibitor to solve the problems in the prior art. During the inventor's research work, it is found that farnesene, which is often used for preparing soap, detergent essence and daily chemical essence and for manufacturing tire, has the function of inhibiting urease activity, which sets a certain foundation for the development of novel urease inhibitors with high efficiency and low toxicity.

In order to realize the above purpose, the present disclosure provides a solution as follows: an application of farnesene in preparing a plant-derived urease inhibitor.

In some embodiments, the farnesene is an extract from loquat leaves.

In some embodiments, the farnesene (with a molecular formula of $C_{15}H_{24}$, and a molecular weight of 204).

In some embodiments, urease inhibited by the farnesene includes *Canavalia ensiformis* urease and soil urease.

In some embodiments, a use concentration of the farnesene is 20-80 µM.

In some embodiments, an application method includes: adding the farnesene into fertilizer.

In some embodiments, the plant-derived urease inhibitor (farnesene) is added into urea, which can prepare plant fertilizer.

The farnesene can effectively reduce the hydrolysis rate of urea, increase the utilization rate of fertilizer nitrogen, and further increase the yield of crops and reduce the environmental pollution.

The present disclosure has the following technical effects:

(1) The plant-derived urease inhibitor disclosed in the present disclosure is prepared by using natural plant loquat leaves as a raw material, and the plant-derived urease inhibitor with a concentration of 10 µM can realize a high inhibition effect on the urease, which has low toxicity, high efficiency and small impact on the ecological environment.

(2) The farnesene prepared in the present disclosure may be used as the urease inhibitor, which enlarges the application of the farnesene, enriches the variety of the urease inhibitor in the field of plant fertilizer, and is conducive to solving the problem that the existing inhibitor has a single urease active site; different urease inhibition mechanisms can improve the urease inhibition effect; and moreover, as a natural plant-derived urease inhibitor, the farnesene is different from the chemically-synthesized commercial urease inhibitor, and has the characteristics of no pollution, environmental protection and high efficiency, thereby having promising application prospect in the future.

(3) The urease inhibitor disclosed in the present disclosure, derived from plants, has "pollution-free" characteristics of natural products, high biological safety, simple and stable chemical structure and remarkable urease inhibition effect, can solve the problems of the conventional chemically-synthesized urease inhibitor such as high toxicity, easy degradation and poor stability, also provides a new concept for creating a biological ecological technology for efficiently inhibiting the rapid hydrolysis of urea in farmland and increasing the utilization rate of urea nitrogen fertilizer, and has good application value and development prospect.

(4) The farnesene prepared in the present disclosure can effectively inhibit the activities of *Canavalia ensiformis* urease and soil urease, and has an effect that is equivalent to that of the commercial urease inhibitor acetohydroxamic acid.

DESCRIPTION OF THE DRAWINGS

To describe the technical solutions in the embodiments of the present disclosure or in prior art more clearly, the drawings used in the embodiments will be simply presented below. Apparently, the drawings in the following description are merely some embodiments of the present disclosure.

DETAILED DESCRIPTION OF PREFERRED EMBODIMENTS

Figure 1:
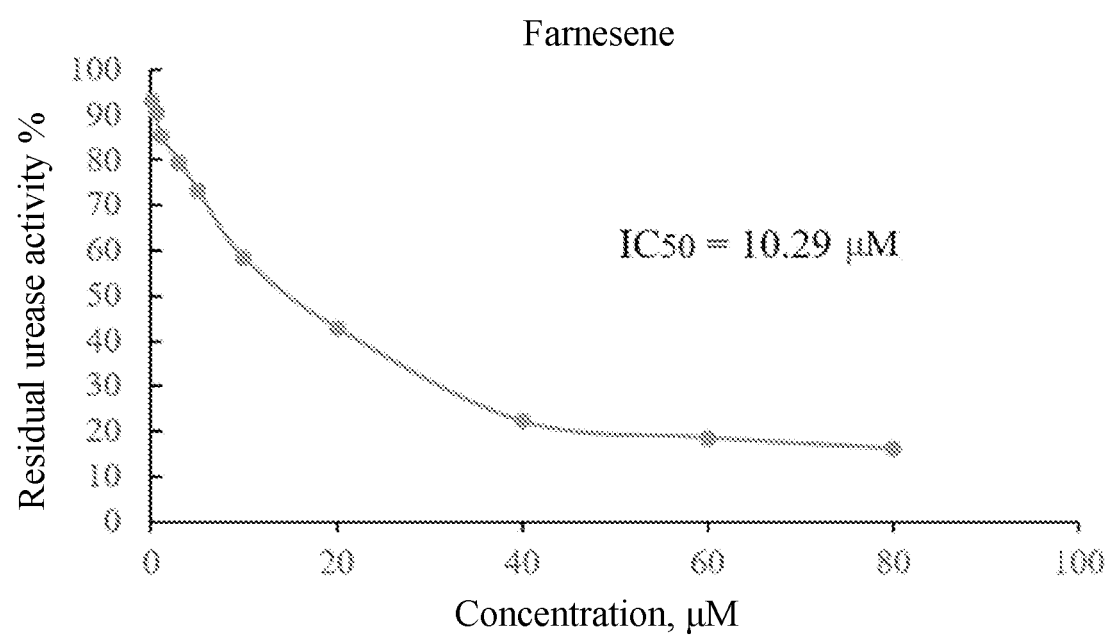
FIG. 1 is a diagram showing an inhibition effect of farnesene with different concentrations on activity of Canavalia ensiformis urease.

Various exemplary embodiments of the present disclosure are described in detail, and the detailed description should not be considered as limitations to the present disclosure, but should be understood as detail description for some aspects, features and implementations of the present disclosure.

It should be understood that terms in the present disclosure are merely used for describing special implementations, rather than limiting the present disclosure. Furthermore, the numerical range in the present disclosure should be construed as specifically disclosing each intermediate value between an upper limit and a lower limit of the range. Any stated value or intermediate value within the stated range and any other stated values or every smaller range within the stated range are also included in the present disclosure. The upper limit and lower limit of these smaller ranges may be included in or excluded from the range independently.

Unless otherwise specified, all technical and scientific terms used herein have the same meaning as commonly understood by those skilled in the technical field of the present disclosure. Although the present disclosure only describes preferred methods and materials, any methods and materials similar or equivalent to those described herein can also be used in the practice or test of the present disclosure. All documents mentioned in the specification are incorporated by reference to disclose and describe the methods and/or materials related to the documents. In case of conflict with any incorporated document, the contents of the specification shall prevail.

It is obvious for those skilled in the art that many improvements and changes can be made to the specific embodiments of the present disclosure without departing from the scope or spirit of the present disclosure. Other implementations obtained from the specification of the present disclosure are obvious to those skilled. The specification and embodiments of the present disclosure are merely exemplary.

Terms "comprise", "include", "having" and "contain" used herein are all open terms, which means including but not limited to.

Unless otherwise specified, raw materials, reagents or apparatuses used in the present disclosure can be obtained from conventional commercial sources, or can be obtained by existing known methods.

It is discovered by research that an extract of loquat leaves has an effect on inhibiting the urease activity; and the extract is identified as farnesene, and the urease inhibition activity of the farnesene is determined.

The Canavalia ensiformis urease and urease inhibitor acetohydroxamic acid both are bought from Aladdin Company and are analytically pure; and the farnescene is bought from Macklin Company and has purity greater than 98%, which is a guarantee reagent.

Embodiment 1

Application of an acyclic sesquiterpene compound in preparing a plant-derived urease inhibitor includes:

(1) Preparation of a Test Sample Solution

Acetohydroxamic acid is weighed, and mixed with 20 mM of HEPES buffer solution (with pH of 7.5) to prepare an acetohydroxamic acid solution of 0.1 μM, 0.5 μM, 1 μM, 3 μM, 5 μM, 10 μM, 20 μM, 40 μM, 60 μM and 80 μM, and the solution is cold stored in a brown bottle in a refrigerator at 4° C. for standby use;

Farnesene prepared in embodiment 1 of the present disclosure is weighed, and mixed with 20 mM of HEPES buffer solution (with pH of 7.5) to prepare a farnesene solution of 0.1 μM, 0.5 μM, 1 μM, 3 μM, 5 μM, 10 μM, 20 μM, 40 μM, 60 μM and 80 μM, and the solution is cold stored in a brown bottle in the refrigerator at 4° C. for standby use;

(2) Preparation of a Canavalia ensiformis Urease Solution

Canavalia ensiformis urease is weighed, and dissolved in 20 mM of HEPES buffer solution (with pH of 7.5) to prepare the Canavalia ensiformis urease solution with a concentration of 10 U/mL, and the prepared solution is cold stored in the refrigerator at 4° C. for standby use.

(3) Preparation of a Urea Solution

Urea is weighed, and dissolved in 20 mM of HEPES buffer solution (with pH of 7.5) to prepare the urea solution with a concentration of 150 U/mL, and the prepared urea solution is freeze stored in the refrigerator at 4° C. for standby use.

(4) Preparation of a Berthelot Developing Solution

Solution A: sodium nitroprusside and sodium salicylate power are weighed respectively, and dissolved in 20 mM of HEPES buffer solution (with pH of 7.5) to prepare a developing solution A containing 9.73 mM of sodium nitroprusside and 700 mM of sodium salicylate, and the prepared developing solution A is cold stored in the refrigerator at 4° C. for standby use.

Solution B: 9 g of sodium hydroxide is weighed, and dissolved in 20 mM of HEPES buffer solution (with pH of 7.5) to obtain a mixed solution, the mixed solution is cooled and uniformly mixed with 12 mL of sodium hypochlorite, then the mixed solution is constant in volume of 50 mL, and the mixed solution is freeze stored in the refrigerator at 4° C. for standby use.

Figure 2:
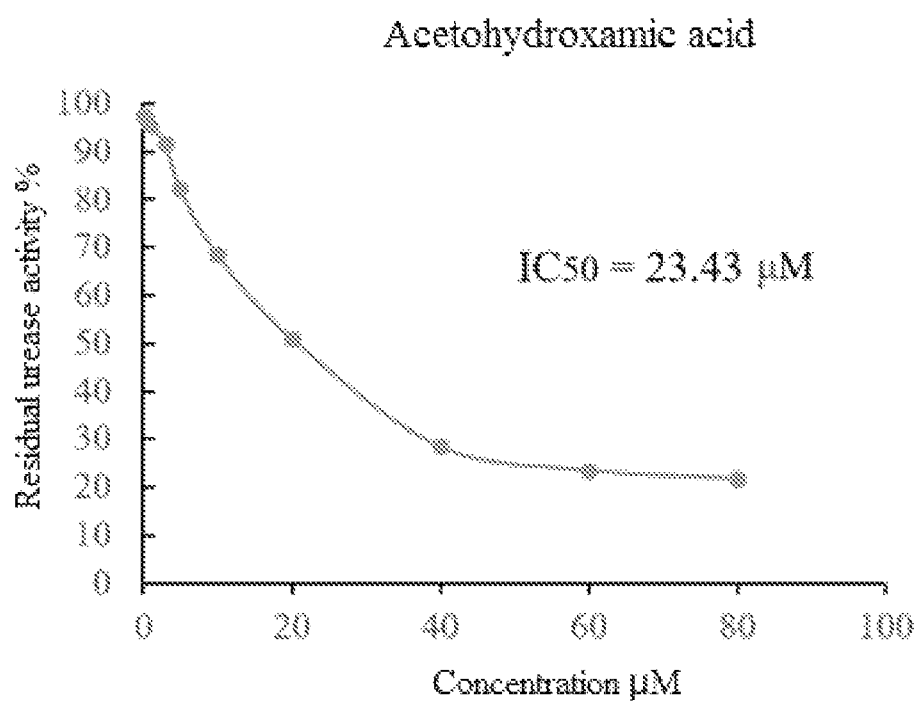
FIG. 2 is a diagram showing an inhibition effect of acetohydroxamic acid with different concentrations on the activity of Canavalia ensiformis urease.

(5) An inhibition effect of the farnesene and acetohydroxamic acid on Canavalia ensiformis urease is determined, and test results are shown in FIG. 1-FIG. 2.

A. 50 μL of the above prepared farnesene solution with different concentrations is collected, added with 100 μL of Canavalia ensiformis urease solution respectively, and uniformly mixed to obtain mixed solutions, and the mixed solutions are incubated for 20 min at 37° C.; 100 μL of urea solution is added for light avoidance reaction for 20 min at a room temperature; the Berthelot developing solution A is added and uniformly mixed, and the Berthelot developing solution B is added for development for 10 min to obtain an incubation solution; and 250 μL of incubation solution is absorbed onto a 96-well plate, an OD absolute value at 595 nm is determined by a microplate reader, and three times of test are carried in parallel for each concentration. A blank sample is replaced with solvent (HEPES buffer solution) of each diluent, and other operations are the same as above, and an OD blank is determined. A corresponding OD relative value is obtained according to the formula 1, and residual activity (RA) is obtained according to the formula 2, and a corresponding median inhibitory concentration $IC_{50}$ is obtained through a concentration-residual activity curve.

OD relative value=OD absolute value−OD blank value   Formula 1;

residual activity (%)=OD relative value (a test sample)/OD relative value (blank)×100%.   Formula 2

B. The method is the same as that in step A, and the difference is that the farnesene solution is replaced with the acetohydroxamic acid solution.

It can be seen from FIG. 1 and FIG. 2 that the median inhibitory concentration ($IC_{50}$) of farnesene for inhibiting the activity of *Canavalia ensiformis* urease is 10.29±0.2504, which is better than that (23.43±0.4511M) of the commercial urease inhibitor acetohydroxamic acid, and shows that the farnesene can remarkably inhibit the activity of *Canavalia ensiformis* urease.

Effect Example 2

Figure 3:
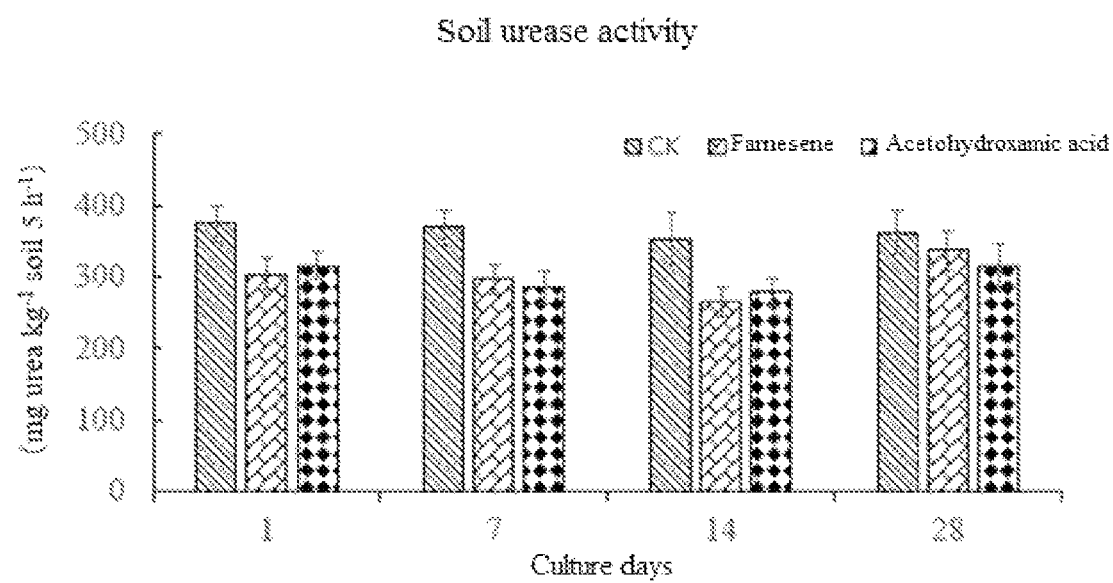
FIG. 3 is a diagram showing an inhibition effect of farnesene and acetohydroxamic acid on the activity of soil urease.

Inhibition effects of farnesene and acetohydroxamic acid on soil urease are determined, and test results are shown in FIG. 3.

(1) Pre-culture of soil: air-dried soil (brown soil) is filtered by a 2 mm sieve and then placed in a culture dish, distilled water accounting for 15% of the weight of the dried soil is added, after the dried soil is uniformly and thoroughly immersed with water, the soil is pre-cultured for 2 weeks in a constant temperature incubator at a constant temperature of 25° C. to restore the biological activity of the soil, and ventilation and constant moisture are kept in the pre-culture period.

(2) The pre-cultured soil is weighed, and added with DMSO solutions of farnesene and acetohydroxamic acid respectively, the concentrations of the farnesene and acetohydroxamic acid are 50 mg/kg (calculated by the dried soil) respectively, and a farnesene-soil mixture and an acetohydroxamic acid-soil mixture are obtained. 5 g of farnesece-soil mixture and 5 g of acetohydroxamic acid-soil mixture are weighed respectively and placed into glass test tubes (length 15 cm×diameter 15 mm), then 5 mL of distilled water is added respectively into the test tubes to make the soil located below a liquid surface, the mixtures in the test tubes are shaken by a vortex shaker and uniformly mixed; and at the same time, the pre-cultured soil without the inhibitor is used as control treatment (CK) and cultured in the constant temperature incubator at a constant temperature of 25° C., and sampling is carried out respectively on the $1^{st}$ day, the $7^{th}$ day, $14^{th}$ day and $28^{th}$ day after the culture (water is supplemented every day according to a weight method so as to keep a total weight of the test tube constant) for determination of urease activity.

Preparation of a reagent: (1) a citrate buffer solution with a pH of 6.7: 368 g of citric acid is collected and dissolved in 600 mL of distilled water, 295 g of potassium hydroxide is collected and dissolved in water, then the two solutions are mixed, the pH of the solutions is adjusted by 1N sodium hydroxide to 6.7, and the solutions are diluted with water to 2 L.

(2) Sodium phenate solution: 62.5 g of phenol is weighed and dissolved in little ethanol, added with 2 mL of methanol and 18.5 mL of acetone, diluted with ethanol until the volume is 100 mL to obtain a solution A, and the solution A is stored in the refrigerator; and 27 g of sodium hydroxide solution is weighed and dissolved in 100 mL of water, and stored in the refrigerator, which is a solution B. Before the use, 20 mL of solution A and 20 mL of solution B are collected respectively and mixed and diluted with distilled water until the volume is 100 mL for standby use.

(3) Sodium hypochlorite solution: sodium hypochlorite is diluted by 10 times with water to obtain a solution containing 0.9% of active chlorine, and the solution is stable.

(4) 10% urea solution.

(5) Methylbenzene.

(6) Standard solution of nitrogen: 0.4717 g of ammonium sulfate is accurately weighed and dissolved in water and diluted until the volume is 1000 mL to obtain 1 mL of standard solution containing 0.1 g of nitrogen.

Drawing of a standard curve: 1 mL, 3 mL, 5 mL, 7 mL, 9 mL, 11 mL and 13 mL of diluted standard solution are absorbed and transferred into 50 mL of volumetric flask respectively and added with distilled water until the volume is 20 mL, and then added with 4 mL of sodium phenate solution and 3 mL of sodium hypochlorite solution. The solution is shaken uniformly while being added, and developed 20 min later, and the volume is fixed. Colorimetric comparison is carried out at a wavelength of 578 nm on a spectrophotometer within 1 h. The standard curve is drawn according to an optical density value and a solution concentration.

A specific determination method is as follows: 10 g of glass test-tube sample (a mixed sample with 5 g of sample and 5 mL of water) cultured at the constant temperature is selected randomly and respectively and transferred into a 50 mL triangular flask, 1 mL of methylbenzene is added, 10 mL of 10% urea solution and 20 mL of citrate buffer solution with pH of 6.7 are added within 15 min, and at the same time, 10 mL of distilled water is used for replacing 10 mL of urea solution as blank control. The above mixture is shaken uniformly and then cultured for 5 h in the incubator at 37° C. The mixture is filtered, then 3 mL of filtrate is collected and injected into the 50 mL volumetric flask, and then colorimetric determination is carried out according to a standard curve developing method. The urease activity is expressed by an amount of urea hydrolyzed per unit soil in unit time. Each treatment is repeated for 3 times, and substrate-free treatment is used as control.

A calculation formula of the urease activity is as follows: the urease activity is expressed by the number of milligrams of $NH_3$—N in 1 g of soil after 5 h.

$NH_3$-N(mg)=$a$×2000;

In the formula, a is the number of milligrams of $NH_3$—N found on the standard curve;

2000 is a coefficient converted into 1 kg of soil.

It can be seen from FIG. 3 that farnesene can effectively inhibit the activity of soil urease, and the inhibition effect lasts for 14 days; and moreover, the inhibition effect is equivalent to that of the commercial inhibitor acetohydroxamic acid, which indicates that the fernesene selected by the present disclosure has remarkable urease inhibition capacity.

Effect Example 3

Figure 4:
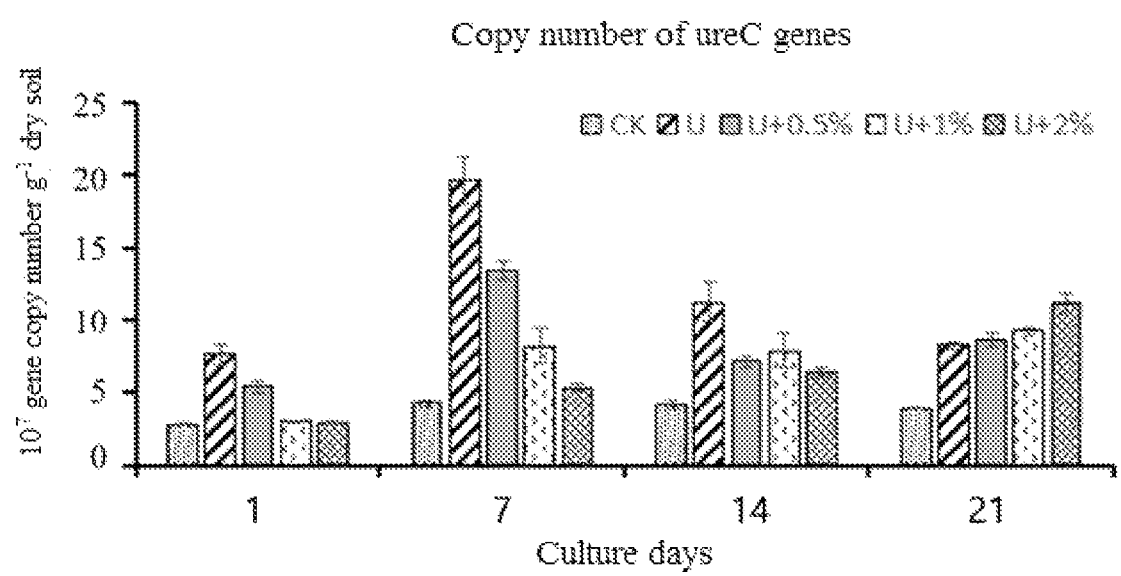
FIG. 4 is a diagram showing an inhibition effect of farnesene with different concentrations on the activity of soil urease-generating bacteria.

An inhibition effect of farnesene on soil urease-generating bacteria is determined, and test results are shown in FIG. 4.

(1) Pre-culture of soil: air-dried soil (brown soil) is filtered by a 2 mm sieve and then placed in a culture dish, distilled water accounting for 15% of the weight of the dried soil is added, after the dried soil is uniformly and thoroughly immersed with water, the soil is pre-cultured for 2 weeks in a constant temperature incubator at 25° C. to restore the biological activity of the soil, and ventilation and constant moisture are kept in the pre-culture period, thereby obtaining the pre-cultured soil.

(2) The pre-cultured soil is weighed; urea is added according to a concentration of 200 mg N kg$^{-1}$ of dry soil; the farnesene is added according to concentrations of pure nitrogen of 0 (U), 0.5% (U+0.5%), 1% (U+1%) and 2% (U+2%); and at the same time, the pre-cultured soil without urea and farnescene is used as control treatment, and 5 treatments are carried out and repeated for 4 times. In each treatment, the required urea and farnesene are dissolved in a certain amount of deionized water according to a required amount, then the solution is uniformly mixed with the pre-cultured soil that is equivalent to 50 g of air-dried soil by a vacuum method, the water content of the soil is enabled to reach 60% of the field water holding capacity (WHC), and finally the solution is placed in a 150 mL centrifugal pipe with a cover. In the culture process, in order to keep the water content of the soil and avoid anaerobic conditions, the cover is opened for ventilation for 10 min every 2 days, then the centrifugal pipe with the solution is cultured in the constant temperature incubator at 25° C., and samples are taken respectively on the 1$^{st}$ day, the 7$^{th}$ day, the 14$^{th}$ day and the 21$^{th}$ day (the water is supplemented every day according to a weight method to keep the total weight of the test tube constant) after the culture, and freeze stored at −80° C. so as to be used for extracting soil DNA and determining a copy number of bacterial ureC genes by quantitative PCR.

The urease-generating bacteria can secrete urease into soil so as to accelerate the hydrolysis of urea; and therefore, to effectively regulate the abundance of urease-generating bacteria can slow down the hydrolysis of the urea, thereby reducing the nitrogen loss in a subsequent nitrogen transformation process. It can be seen from the change of the copy number of the bacterial ureC genes in FIG. 4 that adding the urea significantly stimulates the growth of the urease-generating bacteria, and the farnesene can effectively inhibit the proliferation of the urease-generating bacteria, and the inhibition effect is remarkable, and lasts for 14 days; the inhibition effect is improved with the increase of the consumption of the farnesene; and especially at a preliminary stage of the rapid hydrolysis of the urea, the growth of the urease-generating bacteria can be inhibited significantly, which indicates that the farnesene selected by the present disclosure has remarkable capacity of inhibiting the urease-generating bacteria, and can be used as an efficient plant-derived urease inhibitor in various fields in the future.

Effect Example 4

Influence of Combined Application of Farnescene and Urea on Growth of Corns

Soil required for pot experiment is brown soil collected from Shenyang. 13 g of nitrogen phosphorus potassium fertilizer is used as base fertilizer to be applied in all layers according to a ratio of 26-10-12; and the fertilizer with farnescene and the fertilizer without farnescene are used as control, and the application amount is 0.5%, 1% and 5% of a pure nitrogen content in the fertilizer. Nitrogen fertilizer for test is urea, phosphorus fertilizer is calcium superphosphate, and potassium fertilizer is potassium sulfate. Each treatment is repeated for 5 times. The pretreated soil (filtered by a 5 mm sieve to remove stone pieces, roots, etc.) that is equivalent to 16 kg of air-dried oil is laid on square thick plastic paper with an edge length of 2 m, then the required fertilizer and inhibitor (if necessary) that are uniformly mixed in advance are applied uniformly to the soil, the paper is folded for multiple times by a diagonal folding method, in this period, it is necessary to lay the soil on the paper and then fold the paper, finally the soil is sufficiently and uniformly mixed with the fertilizer and inhibitor, the obtained mixture is transferred into a plastic pot (with a diameter of 28 cm and a height of 34 cm), and finally irrigation is carried out to make the water content of the soil reach 60% of the maximal field water holding capacity. Finally, a height about 5 cm is reserved between the soil surface and the top end of the pot. Three corn seeds are sowed in each pot in a sowing depth of 5 cm, and after the emergence (about 15 days), thinning is carried out to make each pot have one corn. Finally, all potted corns are carried onto a four-wheeled platform lorry and finally transferred into a net house. When in rainy days, the potted corns are transferred into a shed. The corns are watered manually every day in a growth period so as to maintain the soil moisture. The planting density is about 4000 corns per Mu, and a dry weight and yield of the corn are determined in autumn. The result (table 1) shows that the combined application of the fertilizer and farnesene of the present disclosure can effectively increase the dry weight and yield of the corn; and compared with the control treatment without the farnesene, the application of the fertilizer with farnescene that is 0.5%, 1% and 5% of the pure nitrogen content can increase the dry weight by 4.1%, 8.6% and 10.2% respectively, and can increase the yield by 4.5%, 10.1% and 12.2% respectively.

TABLE 1

Dry weight and yield of potted corns under different treatments

| Treatment | Dry weight (kg ha$^{-1}$) | Yield (kg ha$^{-1}$) | Increase of dry weight (%) | Yield increase (%) |
|---|---|---|---|---|
| CK | 15672.2 | 7561.5 | / | / |
| 0.5% | 16006.3 | 8004.2 | 4.1 | 4.5 |
| 1% | 16922.8 | 8521.3 | 8.6 | 10.1 |
| 5% | 17371.5 | 8714.3 | 10.2 | 12.2 |

The above embodiments are merely preferred implementations of the present disclosure rather than limitations to the scope of the present disclosure. Various transformations and improvements made by those ordinary skilled in the art to the technical solution of the present disclosure without departing from the design spirit of the present disclosure shall fall within the protection scope determined by claims of the present disclosure.

We claim:

1. A use of farnesene as a plant-derived urease inhibitor for inhibiting *Canavalia ensiformis* urease and soil urease comprising mixing the farnesene with HEPES buffer solution to form a farnesene solution having a concentration of 20-80 μM, and adding the farnesene solution to a fertilizer.

* * * * *